(12) United States Patent
Vandonkelaar

(10) Patent No.: US 10,486,061 B2
(45) Date of Patent: Nov. 26, 2019

(54) INTERFERENCE DAMPING FOR CONTINUOUS GAME PLAY

(71) Applicant: Zero Latency PTY LTD, North Melbourne (AU)

(72) Inventor: Scott Vandonkelaar, Alphington (AU)

(73) Assignee: ZERO LATENCY PTY LTD., North Melbourne (AU)

( * ) Notice: Subject to any disclaimer, the term of this patent is extended or adjusted under 35 U.S.C. 154(b) by 512 days.

(21) Appl. No.: 15/362,611

(22) Filed: Nov. 28, 2016

(65) Prior Publication Data

US 2017/0274275 A1 Sep. 28, 2017

Related U.S. Application Data

(63) Continuation-in-part of application No. 15/081,711, filed on Mar. 25, 2016, now Pat. No. 9,916,496.
(Continued)

(51) Int. Cl.
*A63F 13/212* (2014.01)
*H04N 5/247* (2006.01)
(Continued)

(52) U.S. Cl.
CPC .......... *A63F 13/212* (2014.09); *A63F 13/213* (2014.09); *A63F 13/35* (2014.09);
(Continued)

(58) Field of Classification Search
CPC ...... A63F 13/212; A63F 13/213; A63F 13/35; G06T 7/292; G06T 7/246; H04N 17/002;
(Continued)

(56) References Cited

U.S. PATENT DOCUMENTS 5,490,239 A 2/1996 Myers
5,509,810 A 4/1996 Schertz et al.
(Continued)

FOREIGN PATENT DOCUMENTS

CN 101859439 A 10/2010
EP 1368788 B1 12/2010
(Continued)

OTHER PUBLICATIONS

International Search Report and Written Opinion for PCT/IB2017/054513 dated Oct. 13, 2017, 12 pages.
(Continued)

*Primary Examiner* — Antoinette T Spinks
(74) *Attorney, Agent, or Firm* — Jennifer Hayes; Nixon Peabody LLP

(57) ABSTRACT

Within a system for operating a virtual reality game or environment, a method is provided for identification of problematic or not well calibrated cameras that are incapable of optimum identification and tracking of game objects. The impact of these identified cameras on the game is reduced on the fly. Most of the time, a few cameras will see an object. The images are mixed to identify the object and its location according to vectors established between cameras and trackable objects. When such mixing of images happens, identification of non-optimum non-calibrated cameras is enabled and performed. The impact of such cameras is then reduced in the overall impact in the game play, providing higher emphasis to images from well calibrated cameras. As such, game stoppage and re-calibration of these few cameras is not required for continuous game play.

6 Claims, 11 Drawing Sheets

Related U.S. Application Data

(60) Provisional application No. 62/379,049, filed on Aug. 24, 2016.

(51) Int. Cl.
| | | |
|---|---|---|
| *A63F 13/213* | (2014.01) | |
| *A63F 13/35* | (2014.01) | |
| *G06T 7/292* | (2017.01) | |
| *G06K 9/00* | (2006.01) | |
| *G06K 9/32* | (2006.01) | |
| *H04N 5/222* | (2006.01) | |
| *H04N 5/232* | (2006.01) | |
| *H04N 17/00* | (2006.01) | |
| *G06T 7/246* | (2017.01) | |

(52) U.S. Cl.
CPC ....... *G06K 9/00771* (2013.01); *G06K 9/3216* (2013.01); *G06T 7/246* (2017.01); *G06T 7/292* (2017.01); *H04N 5/2224* (2013.01); *H04N 5/23203* (2013.01); *H04N 5/247* (2013.01); *H04N 17/002* (2013.01); *G06K 2009/3291* (2013.01); *G06T 2207/10016* (2013.01); *G06T 2207/30196* (2013.01); *G06T 2207/30204* (2013.01); *G06T 2207/30212* (2013.01); *G06T 2207/30241* (2013.01)

(58) Field of Classification Search
CPC .. H04N 5/2224; H04N 5/23203; H04N 5/247; G06K 9/00771; G06K 9/3216
USPC .................................................. 348/211.11
See application file for complete search history.

(56) References Cited

U.S. PATENT DOCUMENTS

| | | | |
|---|---|---|---|
| 5,717,414 | A | 2/1998 | Bergsneider et al. |
| 5,751,289 | A | 5/1998 | Myers |
| 5,997,439 | A | 12/1999 | Oshuga et al. |
| 6,801,637 | B2 | 10/2004 | Voronka et al. |
| 6,950,123 | B2 | 9/2005 | Martins |
| 6,972,787 | B1 | 12/2005 | Allen et al. |
| 7,046,214 | B2 | 5/2006 | Ebersole et al. |
| 7,071,898 | B2 | 7/2006 | Hobgood et al. |
| 7,139,767 | B1 | 11/2006 | Taylor |
| 7,225,548 | B2 | 6/2007 | Sieracki et al. |
| 7,262,747 | B2 | 8/2007 | Ebersole et al. |
| 7,479,967 | B2 | 1/2009 | Bachelder et al. |
| 7,639,233 | B2 | 12/2009 | Marks |
| 7,808,524 | B2 | 10/2010 | Park et al. |
| 7,918,808 | B2 | 4/2011 | Simmons |
| 8,115,814 | B2 | 2/2012 | Iwase et al. |
| 8,131,015 | B2 | 3/2012 | Hildreth |
| 8,537,113 | B2 | 9/2013 | Weising et al. |
| 8,655,020 | B2 | 2/2014 | Saptharishi et al. |
| 8,698,875 | B2 | 4/2014 | Anguelov et al. |
| 8,705,799 | B2 | 4/2014 | White et al. |
| 8,818,420 | B2 | 8/2014 | Schatzberg et al. |
| 8,825,187 | B1 | 9/2014 | Hamrick |
| 8,920,172 | B1 | 12/2014 | Wilmink et al. |
| 8,971,574 | B2 | 3/2015 | Ye et al. |
| 8,988,343 | B2 | 3/2015 | Fei et al. |
| 8,988,508 | B2 | 3/2015 | Yahav et al. |
| 9,068,843 | B1 | 6/2015 | Sohn et al. |
| 9,147,260 | B2 | 9/2015 | Hampapur et al. |
| 9,159,152 | B1 | 10/2015 | Glover et al. |
| 9,215,262 | B2 | 12/2015 | Oyman |
| 9,221,506 | B1 | 12/2015 | Georgeson et al. |
| 9,223,786 | B1 | 12/2015 | Hamrick et al. |
| 9,311,742 | B1 | 4/2016 | Glover et al. |
| 9,443,352 | B1 | 9/2016 | Glover et al. |
| 10,071,306 | B2 | 9/2018 | Vandonkelaar |
| 2003/0120183 | A1 | 6/2003 | Simmons |
| 2004/0063481 | A1 | 4/2004 | Wang |
| 2004/0104935 | A1 | 6/2004 | Williamson et al. |
| 2005/0168486 | A1 | 8/2005 | Sato |
| 2005/0272517 | A1 | 12/2005 | Funk et al. |
| 2006/0055706 | A1 | 3/2006 | Perlman |
| 2006/0247070 | A1 | 11/2006 | Funk et al. |
| 2007/0132785 | A1 | 6/2007 | Ebersole et al. |
| 2007/0242886 | A1 | 10/2007 | St. John |
| 2009/0040308 | A1 | 2/2009 | Temovskiy |
| 2009/0187389 | A1 | 7/2009 | Dobbins et al. |
| 2009/0209343 | A1 | 8/2009 | Foxlin et al. |
| 2009/0278917 | A1 | 11/2009 | Dobbins et al. |
| 2010/0075284 | A1 | 3/2010 | Kozhevnikov et al. |
| 2010/0166260 | A1 | 7/2010 | Huang et al. |
| 2010/0188401 | A1 | 7/2010 | Gordon et al. |
| 2010/0210377 | A1 | 8/2010 | Lock |
| 2012/0086728 | A1 | 4/2012 | McArdle et al. |
| 2012/0142415 | A1 | 6/2012 | Lindsay |
| 2012/0262558 | A1 | 10/2012 | Boger |
| 2012/0321173 | A1 | 12/2012 | Mitarai |
| 2012/0327194 | A1 | 12/2012 | Shiratori |
| 2013/0063432 | A1 | 3/2013 | Kaps et al. |
| 2013/0064427 | A1 | 3/2013 | Picard et al. |
| 2013/0076616 | A1 | 3/2013 | Csaszar et al. |
| 2013/0190086 | A1 | 7/2013 | Maison et al. |
| 2014/0272837 | A1 | 9/2014 | Becker et al. |
| 2015/0088863 | A1 | 3/2015 | Horiba |
| 2015/0097719 | A1 | 4/2015 | Balachandreswaran et al. |
| 2015/0116316 | A1 | 4/2015 | Fitzgerald et al. |
| 2015/0124084 | A1 | 5/2015 | Ikenoue |
| 2015/0149104 | A1 | 5/2015 | Baker et al. |
| 2015/0193949 | A1 | 7/2015 | Katz et al. |
| 2015/0193979 | A1 | 7/2015 | Grek |
| 2015/0193983 | A1 | 7/2015 | Katz et al. |
| 2015/0208058 | A1 | 7/2015 | Denizot et al. |
| 2015/0260474 | A1 | 9/2015 | Rublowsky et al. |
| 2015/0286275 | A1 | 10/2015 | Huang et al. |
| 2015/0302648 | A1 | 10/2015 | Zhang |
| 2016/0026253 | A1 | 1/2016 | Bradski et al. |
| 2016/0027220 | A1 | 1/2016 | Jimenez |
| 2016/0041391 | A1 | 2/2016 | Van Curen et al. |
| 2016/0049085 | A1 | 2/2016 | Beeson |
| 2016/0054837 | A1 | 2/2016 | Stafford |
| 2016/0063731 | A1 | 3/2016 | Yamamoto et al. |
| 2016/0124502 | A1 | 5/2016 | Sawyer et al. |
| 2016/0225156 | A1 | 8/2016 | Ikenoue |
| 2016/0232715 | A1 | 8/2016 | Lee |
| 2016/0257000 | A1 | 9/2016 | Guerin et al. |
| 2016/0364219 | A9 | 12/2016 | Higgins |
| 2016/0364910 | A1 | 12/2016 | Higgins |
| 2017/0039881 | A1 | 2/2017 | Belch et al. |
| 2017/0274271 | A1 | 9/2017 | Vandonkelaar |
| 2017/0274277 | A1 | 9/2017 | Vandonkelaar |
| 2017/0277940 | A1 | 9/2017 | Vandonkelaar |
| 2017/0289221 | A1 | 10/2017 | Khalid et al. |
| 2017/0319956 | A1 | 11/2017 | Vandonkelaar |
| 2018/0043247 | A1 | 2/2018 | Vandonkelaar |
| 2018/0150686 | A1 | 5/2018 | Vandonkelaar |

FOREIGN PATENT DOCUMENTS

| | | | |
|---|---|---|---|
| WO | 2006103662 | A2 | 10/2006 |
| WO | 2015048890 | A1 | 4/2015 |
| WO | 2015123771 | A1 | 8/2015 |
| WO | 2015123774 | A1 | 8/2015 |
| WO | 2018/002698 | A1 | 1/2018 |
| WO | 2018/029515 | A1 | 2/2018 |
| WO | 2018/037269 | A1 | 3/2018 |

OTHER PUBLICATIONS

Li, Y., Development of Immersive and Interactive Virtual Reality Environment for Two-Player Table Tennis, Diss. University of Central Lancashire, 2012, pp. 96-99.

International Search Report and Written Opinion for PCT/US2016/000374 dated Nov. 15, 2016, 10 pages.

Arar et al., Estimating Fusion Weights of a Multi-Camera Eye Tracking System by Leveraging User Calibration Data, Proceedings

(56) References Cited

OTHER PUBLICATIONS of the Ninth Biennial ACM Symposium on Eye Tracking Research and Applications, 2016, pp. 225-228.

Ehrl et al., A Reliability Measure for Merging Data from Multiple Cameras in Optical Motion Correction, Proc. ISMRM Scientific Workshop—Motion Correction in MRI, 2014, 1 page.

Guerra-Filhol, Optical Motion Capture: Theory and Implementation, Journal of Theoretical and Applied Informatics (RITA), 2005, vol. 12(2), pp. 1-29.

Mannberg et al., High Precision Real-Time 3D Tracking Using Cameras, Infotech at Aerospace, American Institute of Aeronautics and Astronautics, 2011, pp. 1-11.

Vasylevska et al., Influence of Vertical Navigation Metaphors and Presence, Proceedings of the International Society for Presence Research, 2014, pp. 205-212.

International Search Report and Written Opinion for PCT/IB2016/057844 dated Feb. 22, 2017, 15 pages.

International Search Report and Written Opinion for PCT/IB2016/057845 dated Mar. 3, 2017, 10 pages.

International Preliminary Report on Patentability for PCT/IB2016/000374 dated Sep. 28, 2018, 8 pages.

International Search Report and Written Opinion for PCT/IB2016/000374 dated Nov. 15, 2016, 10 pages.

International Search Report and Written Opinion for PCT/IB2016/000381 dated Dec. 23, 2016, 15 pages.

International Preliminary Report on Patentability for PCT/IB2016/057842 dated Jan. 1, 2019, 6 pages.

International Preliminary Report on Patentability for PCT/IB2016/057844 dated Feb. 12, 2019, 9 pages.

International Preliminary Report on Patentability for PCT/IB2016/057845 dated Feb. 26, 2019, 7 pages.

S602

Place a calibration object in a game space so it is visible to a plurality of one or more color cameras, the calibration object comprising at least three colored calibration marker lights mounted in a specified orientation on the calibration object, and wherein the calibration object is placed in the game space in a specified orientation relative to the one or more color cameras;

S604

For each color camera, determine in an image captured at the camera, a position of each of the calibration marker lights, and convert each of these positions to vectors relative to a zero origin;

S606

Analyze the vectors to determine a best fit for the position of each calibration marker light, and convert the detected orientation of the calibration object into a position and orientation respective of the camera for use thenceforth in operation of the game.

FIG. 6

INTERFERENCE DAMPING FOR CONTINUOUS GAME PLAY

CROSS-REFERENCE TO RELATED APPLICATIONS

This application is a continuation-in-part of U.S. patent application Ser. No. 15/081,711, titled: SYSTEMS AND METHODS FOR OPERATING A VIRTUAL REALITY ENVIRONMENT USING COLORED MARKER LIGHTS ATTACHED TO GAME OBJECTS filed Mar. 25, 2016.

The present patent application also claims priority to provisional application No. 62/379,049, entitled "INTERFERENCE DAMPING FOR CONTINUOUS GAME PLAY", filed Aug. 24, 2016, the entirety of which is herein incorporated by reference.

BACKGROUND

1. Field

This invention relates to the field of virtual reality and in particular to systems and methods which track object locations using colored tracking marker lights and a plurality of color cameras.

2. Related Art

Conventional virtual reality systems which allow free-roaming for players use infrared tracking to determine the positions of players and other objects. Alternatively, a tracking system using colored marker lights has advantages in the ability to differentiate players and objects, however accurately tracking markers over a relatively broad space or other virtual reality environment is difficult without using a plurality of cameras. Using a plurality of cameras presents a challenge with respect to position calibration, coordination, and synchronization. Also, issues related to colored tracking markers conflicting with each other as players roam about a space used for virtual reality environment also present a challenge as markers with the same color may come within a close proximity to one another. Further, during system operation many different cameras may see the same object but some cameras are frequently known to report the object's position more precisely than other cameras. Therefore, a method is needed to dynamically determine—without interrupting system operation and game play—which cameras track objects more accurately and de-emphasize those cameras that are less accurate.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

A computerized method is provided. One or more processors are configured to determine a position of an object in a virtual reality environment while de-emphasizing cameras having less than optimum positioning accuracy. The method includes locating an object in images received from two or more cameras, determining one or more intersections of vectors, wherein each vector originates at a camera and passes near the object, establishing a system-wide tracking error margin that represents the maximum allowable error for any detected intersection. The method also includes initializing an object position vector for the object and a total position weight for the object. For a first intersection formed between a pair of vectors, the method also includes (a) identifying an intersect error margin for the intersection that comprises the closest distance between the pair of vectors, (b) computing a weight by subtracting the intersect error margin from the tracking error margin and dividing the result by the tracking error margin, (c) determining a position for the intersection based on the pair of intersecting vectors, (d) multiplying the position by the weight, and adding the product to the object position vector to produce a revised object position vector, and (e) adding the weight to the total position weight. The method also includes dividing the revised object position vector by the total position weight to produce a final position for the object. In some embodiments, the method also includes repeating steps (a) through (e) for a second intersection formed between a pair of vectors. The method also includes locating a plurality of objects with the two or more cameras, and repeating all of the steps for each of the plurality of objects.

BRIEF DESCRIPTION OF DRAWINGS

The accompanying drawings, which are incorporated into and constitute a part of this specification, illustrate one or more examples of embodiments and, together with the description of example embodiments, serve to explain the principles and implementations of the embodiments.

FIG. 6 depicts a flowchart for initial position calibration of each of a plurality of cameras using a calibration object, according to an exemplary embodiment.

DETAILED DESCRIPTION

Embodiments will be described below in more detail with reference to the accompanying drawings. The following detailed descriptions are provided to assist the reader in gaining a comprehensive understanding of the methods, apparatuses, and/or systems described herein and equivalent modifications thereof. Accordingly, various changes, modifications, and equivalents of the methods, apparatuses, and/or systems described herein will be apparent to those of ordinary skill in the art. Moreover, descriptions of well-known functions and constructions may be omitted for increased clarity and conciseness.

The terms used in the description are intended to describe embodiments only, and shall by no means be restrictive. Unless clearly used otherwise, expressions in a singular from include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Systems and methods are disclosed for operating, calibrating, and dynamically optimizing a system for a virtual reality environment where colored marker lights are attached to objects.

The objects may include players, controllers, and devices related to the game or another virtual reality experience.

One or more color cameras are used to view one or more spaces, and track positions and orientations of players and other objects according to the attached marker lights. A hierarchical system of servers is used to process positions and orientations of objects and provide controls as necessary for the system. A method for color assignment is described as well as a calibration process, and a dynamic optimization process. A synchronization process is also described that ensures that a plurality of cameras and attached servers are properly coordinated. Head-mounted devices may also be used in conjunction with marker lights to provide information regarding players.

Figure 1:
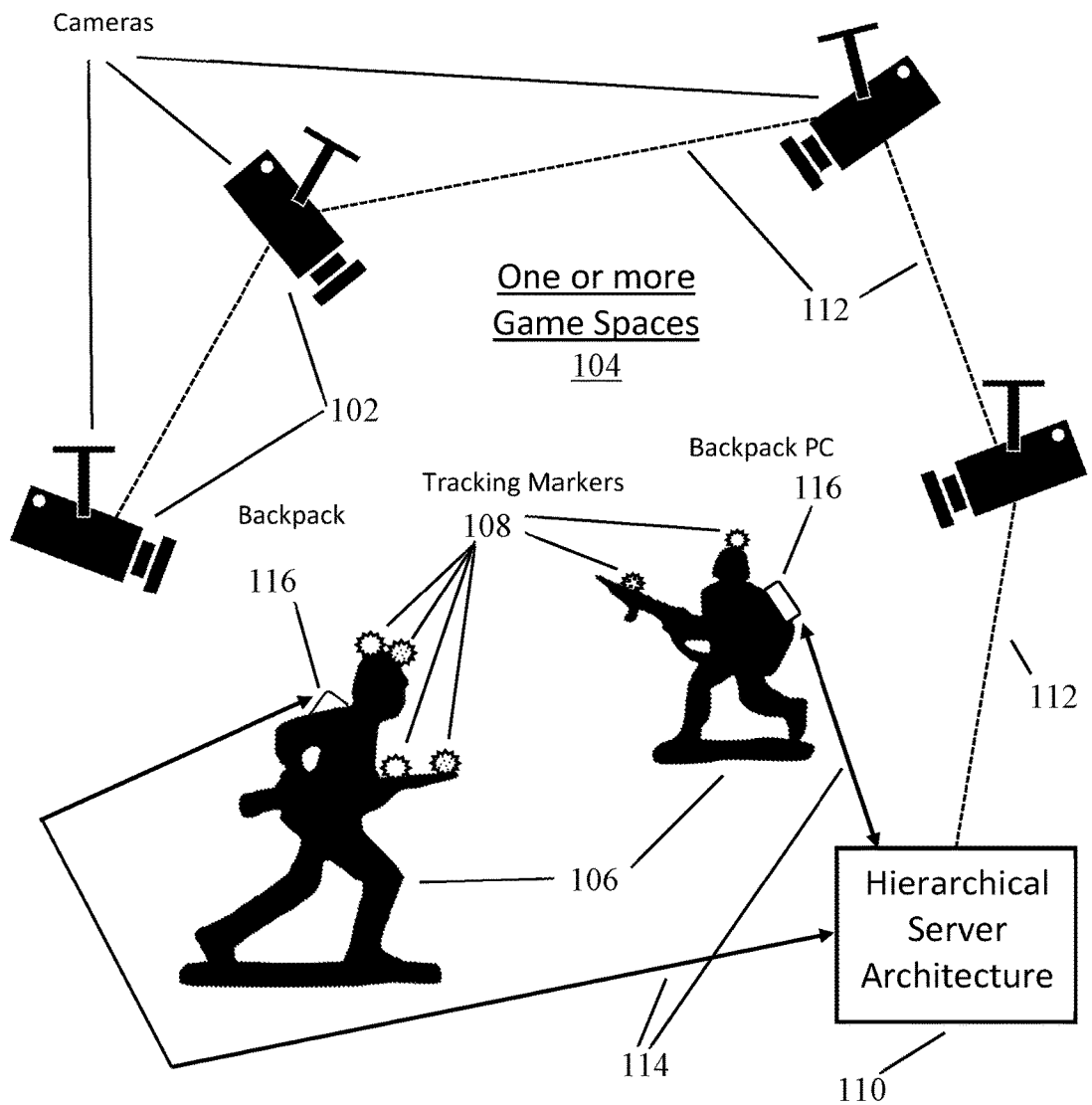
FIG. 1 depicts a system comprising a plurality of cameras which track objects such as players and controllers with tracking markers attached thereto, according to an exemplary embodiment.

FIG. 1 depicts a system comprising a plurality of cameras which track objects such as players and controllers with tracking markers attached thereto, according to an exemplary embodiment. For instance, pictured in FIG. 1 is a plurality of color cameras 102 viewing one or more spaces 104 of a virtual reality. A plurality of spaces or other virtual reality environments in the same physical space are supported by a logical or virtual division of the physical space into a plurality of virtual spaces where a single game may be operated in one of the plurality of virtual spaces or other virtual reality environments. Cameras 102 or other optical detectors suitable of detecting radiation from tracking markers 108, including infrared detectors, RGB cameras, hyperspectral sensors, and others.

The space/spaces being viewed by the camera, as described above and hereafter throughout the specification may include any kind of space used by a user/player to participate in the virtual reality experience, the virtual reality experience comprising a virtual reality game or any other form of virtual reality experience.

Typically, at least two cameras 102 are utilized to observe the one or more spaces 104 or other virtual reality environments, however the limit to the number of cameras 102 is not limited thereto and only a single camera or more than two cameras may be utilized to observe the one or more spaces 103. Cameras 102 may be connected to a hierarchical server architecture 110 which analyzes images viewed by cameras 102 and communicates with players 106 and other objects such as game controllers, simulated weapons etc., all of which include tracking markers 108 for observation by cameras 102. The hierarchical server architecture 110 will be described in more detail below, with reference to FIG. 3 and FIG. 4.

Connections 112 between cameras 102 and server architecture 110 may be either hardwired such as Ethernet, or alternately wirelessly connected such as, for example, Wi-Fi connectivity. However, the form of connection 112 is not limited thereto and other forms of establishing a network may be used. Communication between server architecture 110 and players 106 and other game objects for both control and sensing purposes may be performed through wireless connectivity 114 which may include Wi-Fi connectivity or other forms of wireless connectivity.

According to another embodiment, communication between the server architecture 110 and players 106 may be performed through a wired connection. For some embodiments of the invention, players 106 may carry a form of backpack PC 116 which may interface electronically with a form of head-mounted device and/or a controller or simulated weapon device carried by the player. Alternately, backpack PC 116 may communicate wirelessly and directly with the head-mounted device and or the controller or simulated weapon device carried by the player, however this form of communication is not limited thereto and the communication may be performed via a wired connection.

Figure 2:
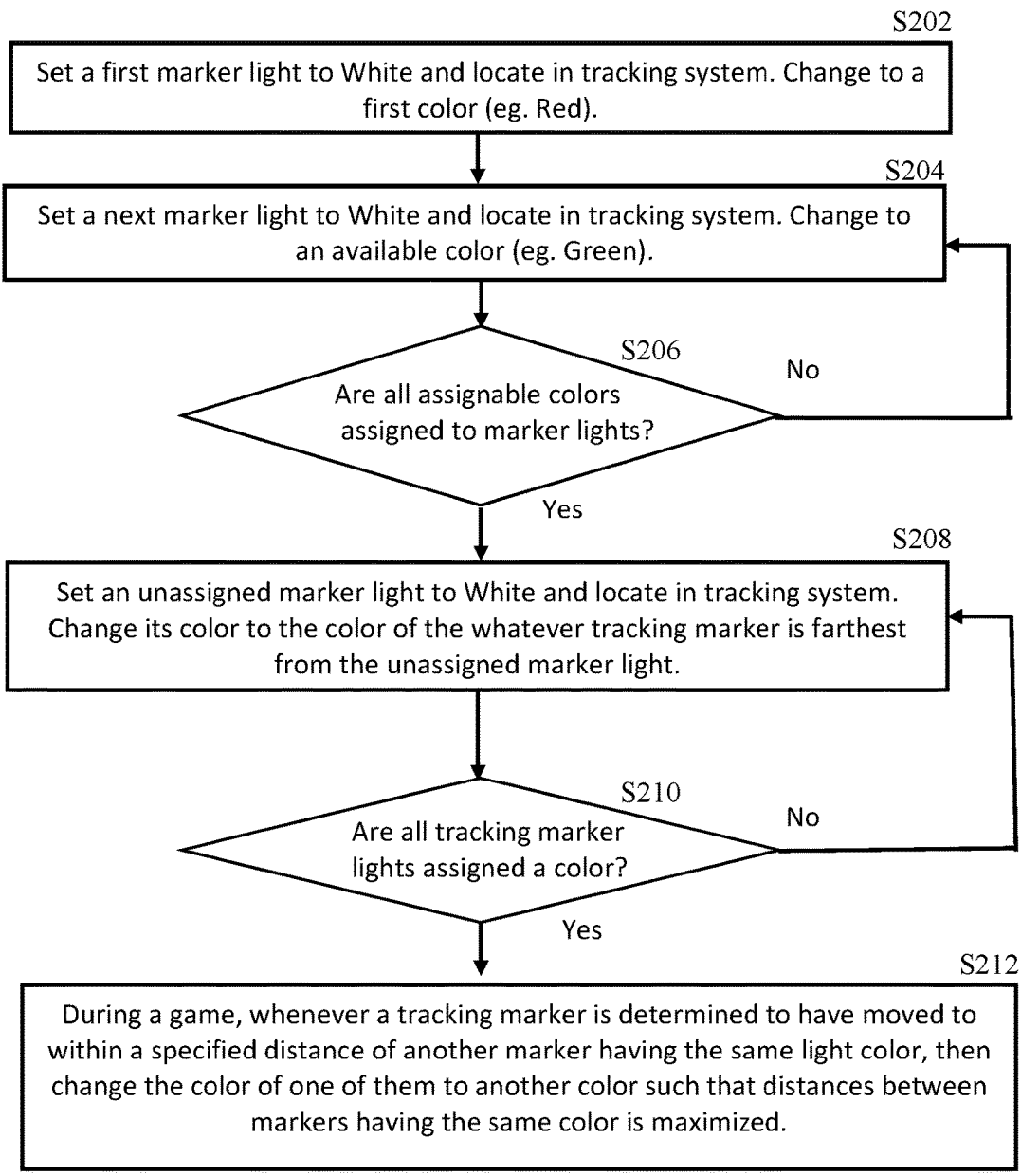
FIG. 2 depicts a flowchart for initial color assignment before play as well as dynamic reassignment of colors during game play, according to an exemplary embodiment.

An example process for initial color assignment for the tracking marker lights 108 before play, and for dynamic color reassignment for the marker lights 108 during play, is shown in FIG. 2. In step S202, a first marker light 108 is set to white, then is viewed by one or more cameras 102, and is located in the tracking system of depicted in FIG. 1. The first marker light 108 is then changed to a first color, for example red. Next, in step S204 a next marker light 108 is set to white and located by the tracking system in the same manner as step S202. Subsequently, this next marker light 108 is changed to a different available color, for example green.

In other examples, the tracking marker lights 108 may be other light or radiation sources, including fluorescent light sources, infrared bulbs, or other types of light sources.

At this point, it is determined, per step S206, if all assignable colors have been assigned to marker lights 108. If not, step S204 is executed again with a next marker light 108 and changed to a next available color which might be, for example, blue, since red and green have been assigned. If all assignable colors have been assigned to marker lights 108 the process proceeds to step S208. Note that an exemplary list of assignable colors may comprise White (R,G,B), Red (R), Blue (B), Green (G), Yellow (R,G), Cyan (B,G), Magenta (R,B). This list of assignable colors is merely exemplary and color variations in-between the listed available colors are also possible.

In step S208, the process starts assigning colors to new unassigned marker lights 108 where the color has been previously assigned to at least one other marker light 108. As such, the system considers the distance from the new unassigned marker light 108 to the previously assigned marker lights 108 in making a color choice. Per step S208, a next unassigned marker light 108 is set to white and located in the tracking system. Subsequently its color is changed to be the same as whichever tracking marker, previously assigned with a color, is farthest from this next unassigned marker light 108. In step S210 it is determined if all tracking marker lights 108 have been assigned a color. If not, step S208 is repeated until all marker lights 108 have been assigned a color. Otherwise, the process proceeds to cover dynamic color reassignment during operation of a game.

Per step S212, whenever during a game a tracking marker 108 is determined to have moved within a specified minimum distance of another tracking marker 108 having the same light color, the color of one of the two tracking markers is changed to another color such that distances between markers having the same color is maximized. The specified distance may vary based on the size of the game arena. As such, one of the tasks of the server architecture 110 is to keep track of all distances between tracking markers 108 having the same color, and compare those distances with the specified minimum distance.

Figure 3:
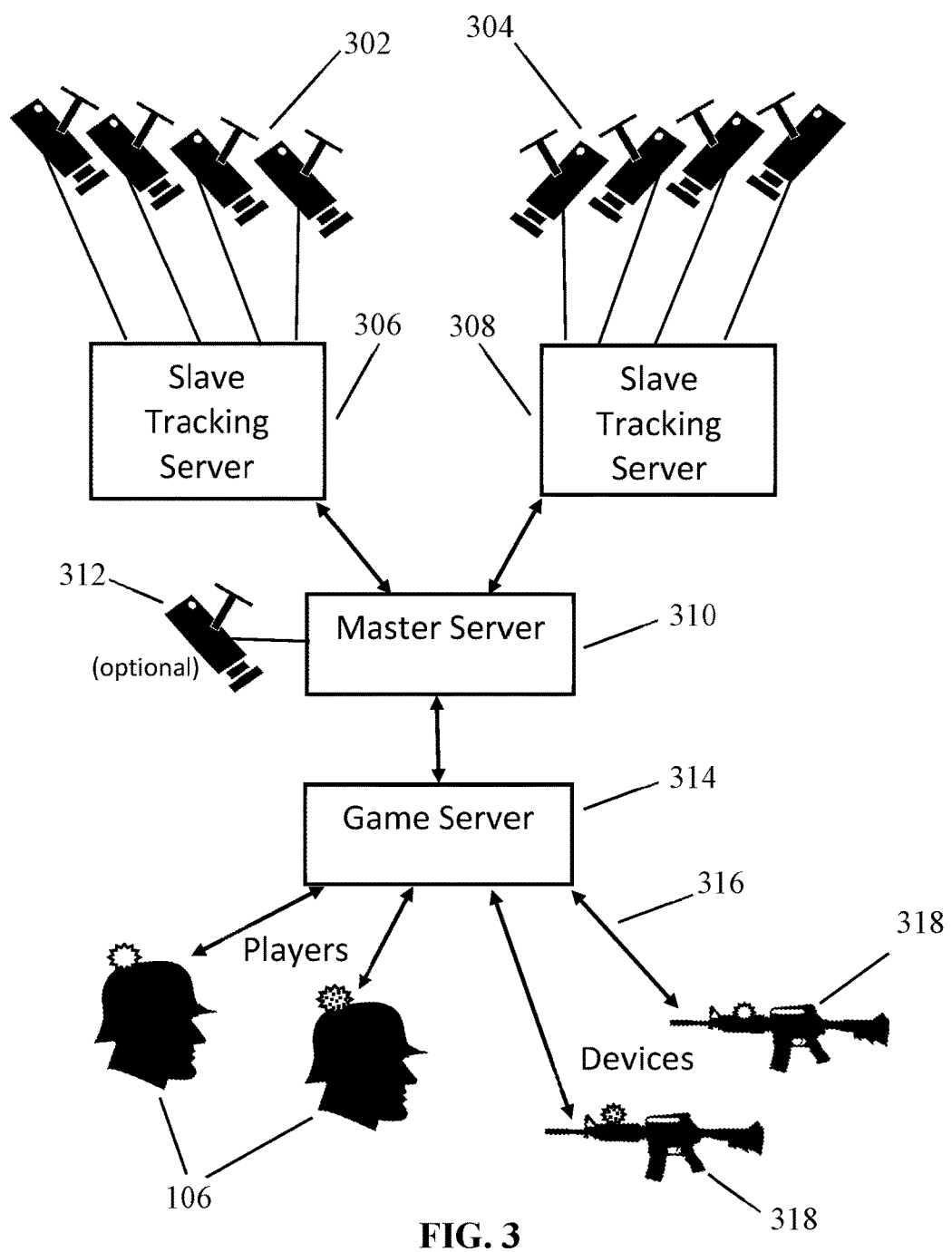
FIG. 3 depicts a system comprising a plurality of cameras, players, and controllers connected to a hierarchical server architecture, according to an exemplary embodiment.

FIG. 3 depicts a system comprising a plurality of cameras, players, and controllers connected to a hierarchical server architecture, according to an exemplary embodiment. Here, one bank of color cameras 302 connects with slave tracking server 306, while another bank of color cameras 304 connects with slave tracking server 308. Positions and movements of game objects tracked by slave tracking servers 306 and 308 are consolidated in master server 310 which may optionally have one or more local cameras 312 connected to it. Note that calibration of tracking marker 108 positions may be performed locally on the server(s) observing that tracking marker. The number of slave tracking servers and master server depicted in FIG. 3 is merely exemplary and not limited thereto. Furthermore, the functionality of the slave tracking server and the master tracking server may be combined into a single server, according to an exemplary embodiment.

When a slave tracking server such as 306 or 308 receives an image, they immediately process the image to identify any tracking markers in the optical data of the image. The slave tracking server 308 immediately sends the processed data to the master server 310 and performs no further processing on that particular image, according to an exemplary embodiment. This may include identifying a pixel row and column location of the tracking marker 108, including with a time stamp camera identification.

Master server 310 interfaces with game server 314 which communicates wirelessly 316 with players 106 and other devices 318 which may include for example any of controller devices including simulated weapons, according to one exemplary embodiment. The communication may even be conducted via a wired connection, according to another exemplary embodiment.

The Master server 310 collects all the processed data from both local cameras 312 and slave servers 306 and 308. It continues to store all this information until it has a complete set of data from each camera in the system or until it receives repeated data from the same camera. Once the data set is considered complete, it performs the next stage of processing on each individual camera image to create a list of all the intersections of the data points from the cameras where the tracking marker is a match. Positions of these intersection points are then averaged out to create the final processed position for each tracking marker. Where not enough information is available to create an accurate intersection or the information conflicts within a threshold, the information may be optionally discarded.

Figure 4:
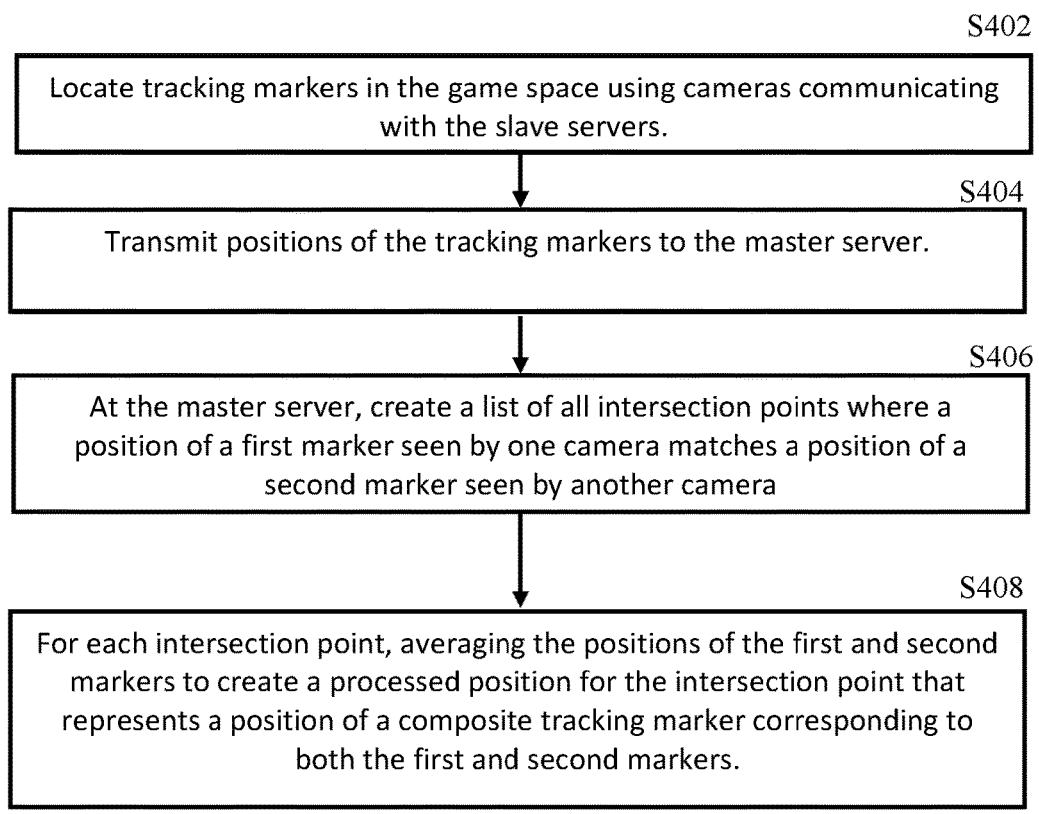
FIG. 4 depicts a flowchart for synchronizing a plurality of cameras with consistent and accurate location of game objects, according to an exemplary embodiment.

FIG. 4 depicts a flowchart illustrating this process for synchronizing a plurality of cameras with consistent and accurate locations of objects, according to an exemplary embodiment. In step S402, tracking markers in the space are located using cameras 302 and 304 communicating with slave servers 306, 308. In step S404, positions of tracking markers are communicated from the various slave servers 306, 308 to master server 310. In step S406 a process operating on the master server creates a list of all intersection points where a position of a first marker seen by one camera matches a position of a second marker seen by another camera. Then in step S408, for each intersection point in the list of intersection points, the positions of the first and second tracking markers are averaged to create a processed position for that intersection point, and represents a position of a composite tracking marker corresponding to both the first and second tracking markers that will be used thenceforth in operation of the game.

The master server 310 and the slave servers 306,308 are exemplary embodiment forming part of the hierarchy server where the master server 310 may have unidirectional control over the slave servers 306, 308. However, the master and the slave servers may be incorporated into a single server which performs the below defined functions of both the master server 310 and the slave server 306, 308, according to an exemplary embodiment.

Figure 5:
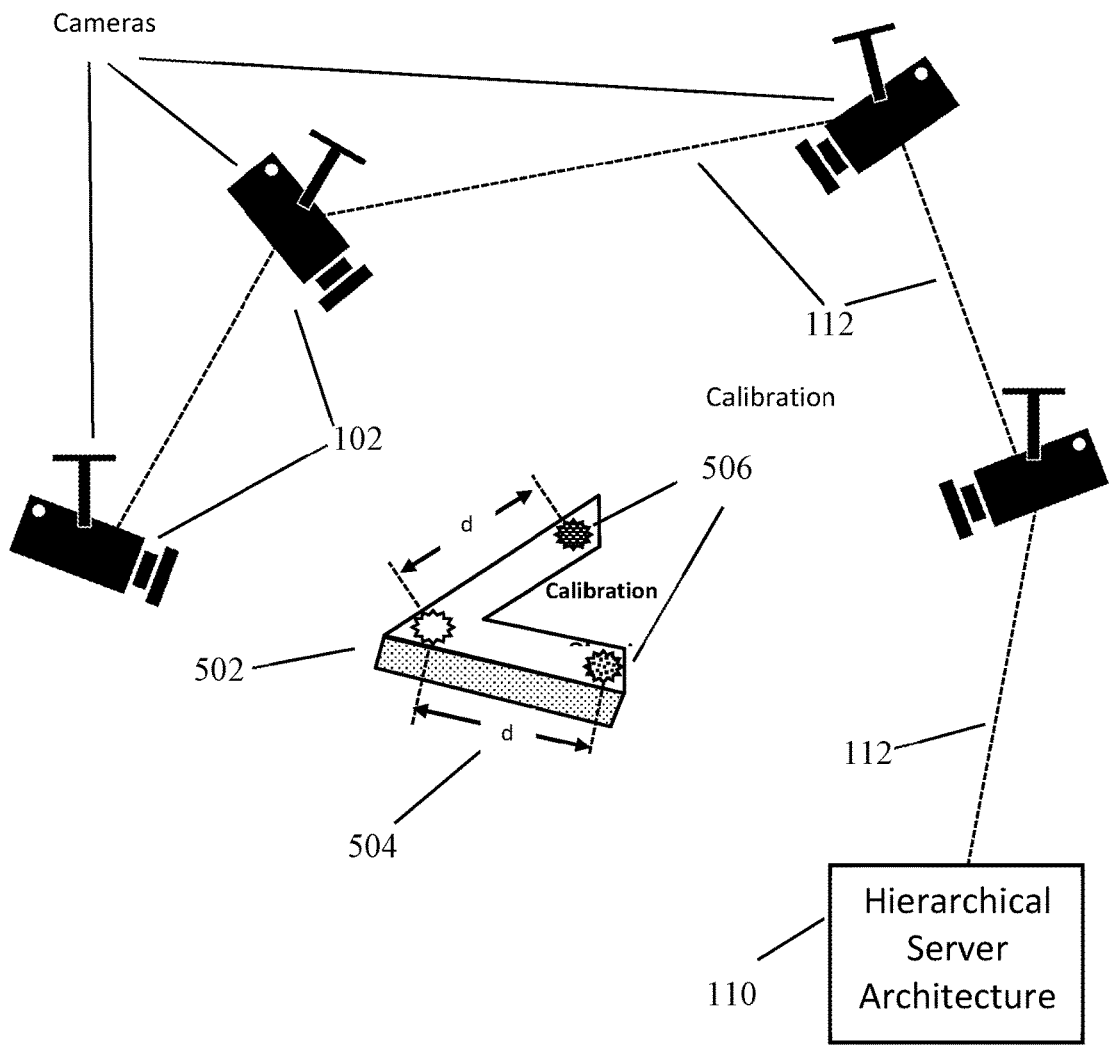
FIG. 5 depicts a system for position calibration of each of a plurality of cameras using a calibration object, according to an exemplary embodiment.

Before game begins, it is important to calibrate the system such that cameras observing a space or other virtual reality environment are accurately coordinated with respect to positions of game objects. FIG. 5 depicts a system performing an initial calibration using a calibration object 502.

When the system is initially set up, all the cameras are plugged in and nothing is configured for the space. It is important that the tracking servers are programmed with position with the position and orientation of the cameras in 3D space.

To do this, one exemplary calibration configuration according to the invention involves laying out a 1 meter grid on the flat ground. This could be achieved using masking tape or other available means. This grid is visible to the cameras. The grid serves as a guide for where the virtual space will be defined, and a center point is chosen in the room to be the center in the virtual space (x:0, y:0, z:0).

Then, a calibration device 502 is placed on the 1-meter grid. One exemplary configuration for the calibration device is an L-shape (90 degree angle) with arms each measuring 1 meter long (dimension "d" 504), with a colored ball or calibration marker light 506 at each end of the arm and also at the center. The length mentioned above is merely exemplary and a different shape and size of calibration device with a different number of marker lights 506 may be used.

These colored balls or calibration marker lights 506 may be powered, and set to fixed colors. An exemplary configuration would include Green in the center, Blue on one arm and Red on the other, however different colors may be used. By placing the calibration device in the grid at the center of the space, with the blue arm oriented in a specific direction, the calibration software can automatically detect the location of the cameras which can see all 3 colored markers on the calibration device.

The calibration process allows the operator to select a camera, and perform the following process:

1) Detect the 3 colored markers are in the next image to come from the camera and record their positions in the image.

2) Convert the positions in the image to vectors from a zero origin, pointing to the recorded position.

3) The vectors are analyzed to find the 'best fit' which would allow the markers to show up in that position.

4) When the right fit is found, the detected orientation of the calibration device is converted into a position and orientation for the camera.

5) The position and orientation is associated with the camera.

This initial calibration process is further described in the flowchart of FIG. 6 where step S602 describes placing a calibration object in a space so it is visible to a plurality of one or more color cameras, the calibration object comprising at least three colored calibration marker lights 506 mounted in a specified orientation on the calibration object, and wherein the calibration object is placed in the space in a specified orientation relative to the one or more cameras. Per step S604, for each camera, a position of each of the calibration marker lights is determined in a captured image, and each of these positions is converted to vectors relative to a zero origin. Then per step S606, the vectors are analyzed to determine a best fit for the position of each calibration marker light and the detected orientation of the calibration object is converted into a position and orientation respective of the camera for use thenceforth in operation of the game.

The detected calibration for the camera can be validated by the operator as the system may also draw a dotted line over the video feed to show where it believes the grid on the floor should be. In the instance where the calibration device is not available, the cameras may be configured manually using the dotted line overlay. All camera calibration data is then stored on the tracking system server that the cameras are connected to (be it a slave server, master server or a combination of the two).

Figure 7:
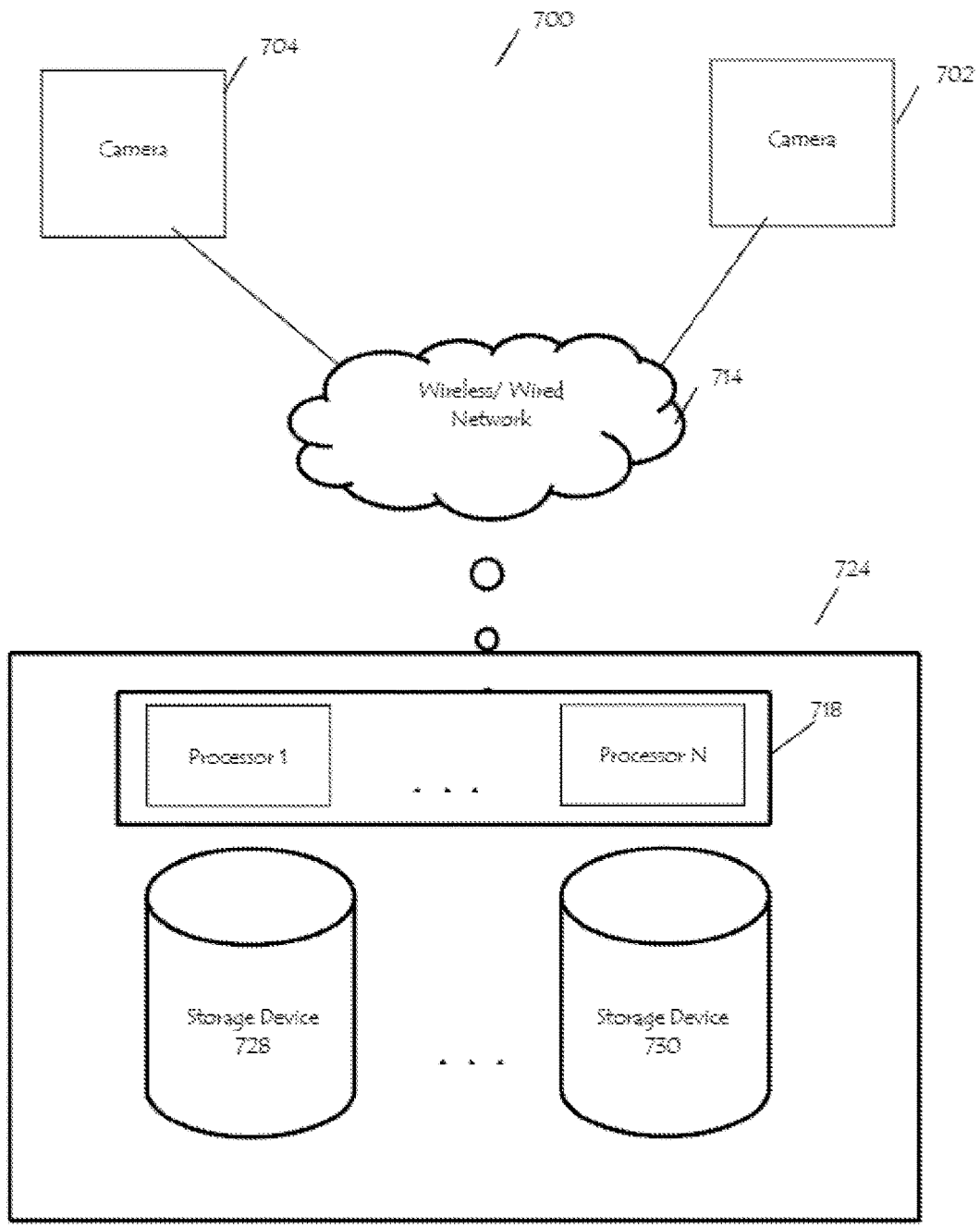
FIG. 7 depicts a block diagram of a system of a plurality of cameras communicating with a server, according to another exemplary embodiment.

FIG. 7 depicts a block diagram of a gaming system 700, according to another exemplary embodiment. The system 700 includes Cameras 702 and 704 and VR server 724. The cameras, 702 and 704, may be capable of accessing the VR server 724 either directly or indirectly over a network 714. The cameras, 702 and 704, may access the VR server 724 over the network 714 using wireless or wired connections supporting one or more point-to-point links, shared local area networks (LAN), wide area networks (WAN), or other access technologies. These cameras 702 and 704 may be transmitting video, audio or other kinds of data to the VR server 724.

According to the exemplary embodiment depicted in FIG. 7, the VR system 700 is a type of system that provides tracking of marker lights on players or their controllers or other game objects using cameras 702 and 704 using storage devices 728, 730 and multiple processors 718. However, it should be appreciated that alternate embodiments of the VR system 700 may use a single processor and storage device and the depicted embodiment is merely exemplary. Furthermore, although FIG. 7 depicts a single server 724, the VR system may comprise multiple servers splitting up the functionalities which are performed by the depicted server 724, as described in the exemplary embodiment of FIG. 1.

In the exemplary embodiment depicted in FIG. 7, the VR server 724 may receive the location information and other action/state information regarding a user holding a controller, colors assigned to the tracking lights on the controller or other game objects etc. in a space using the cameras 702 and 704. The VR server 724 may be realized as a software program stored in a memory and executing on a central processing unit (CPU).

The VR server 724 may use video images from the tracking cameras 702,704. In some embodiments, the VR server 724 receives video images over video cables connected to the cameras, however the images may be transferred wirelessly. Possible video cable types include analog formats such as composite video, S-Video and VGA; and digital formats such as HDMI and DVI, however these are mere exemplary embodiments and the possibilities are not limited thereto. In another embodiment, the slave server receives video images over a wireless communication connection.

The VR server 724 may follow the procedures described in FIG. 2, FIG. 4 and FIG. 6 for assignment and reassignment of colors to the tracking marker lights, and synchronization and calibration of the cameras 702,704.

The present disclosure emulates a real-world experience for players, and as such the experience players have is quite real, just as pilots in flight simulators experience all the aspects of flying a real airplane. The disclosure is deeply intertwined with computer and networking technology without which it would not be possible. In fact, the functions described herein have an extremely time-sensitive nature to their operation in order to achieve a true virtual reality experience, and without an intimate integration with the described hardware would not function properly, if at all.

The dynamic reassignment of colors during a game based on changing distances between light markers having the same color is a function grounded in reality. The use of a physical calibration device to calibrate distances for each camera as well as the process for synchronizing positions among a plurality of cameras, are all concrete functionalities.

A further embodiment of the invention deals with the identification and de-emphasis of problematic or not well calibrated cameras that are incapable of optimum identification and position tracking. According to the invention, the impact of these identified cameras on a virtual reality game is reduced on the fly without disturbing operation of a game in progress. Most of the time, a plurality of cameras will see an object, and images from those cameras are mixed to identify the object and its location. When such mixing of images happens, identification of non-optimum or not well calibrated cameras is enabled and performed during the game. The impact of such cameras is then dynamically de-emphasized or reduced with respect to their impact in the game play, providing higher emphasis to images from well calibrated cameras. As such, game stoppage for re-calibration of these few cameras is not required for continuous game play.

Camera calibration includes where the system believes the camera is situated in the physical space and its orientation. This is simply stored as X, Y, Z coordinates and Roll, Pitch and Yaw (Euler angle). A bad calibration is where any of these values are incorrect for the camera which can be caused by anything from a hard physical knock or even tiny vibrations, causing the camera to move slightly.

When a camera's calibration isn't quite right it results in poor readings as the camera will begin to identify objects in the wrong location/position. This is most often caused by incorrect orientation values, as the position data has a smaller effect on results. The error for a bad orientation gets worse as the reading gets further away from the camera while a bad position will remain constant. In the instance where a camera's calibration is poor, that camera will then be transmitting results which are inaccurate by an unknown amount to the master system.

A camera cannot be used at all in the system if it is not calibrated. The system typically ignores any camera which is not yet calibrated. A non-calibrated camera will have all its values set to 0, a non-optimum camera will have values but they won't be quite right. In an instance where only poor camera data is available for all cameras that see a tracked object, it means that there is no good tracking data available to improve the result. In this instance tracking quality and user experience will degrade as the tracking won't be optimum.

There are degrees of accuracy in the cameras so it's possible for a camera to keep functioning and still add some value without a perfect calibration. It's only when the results from a camera become so poor that the system deems them too inaccurate to use that the camera is no longer adding value to the tracking process. Then, such a camera is de-emphasized.

Figure 8:
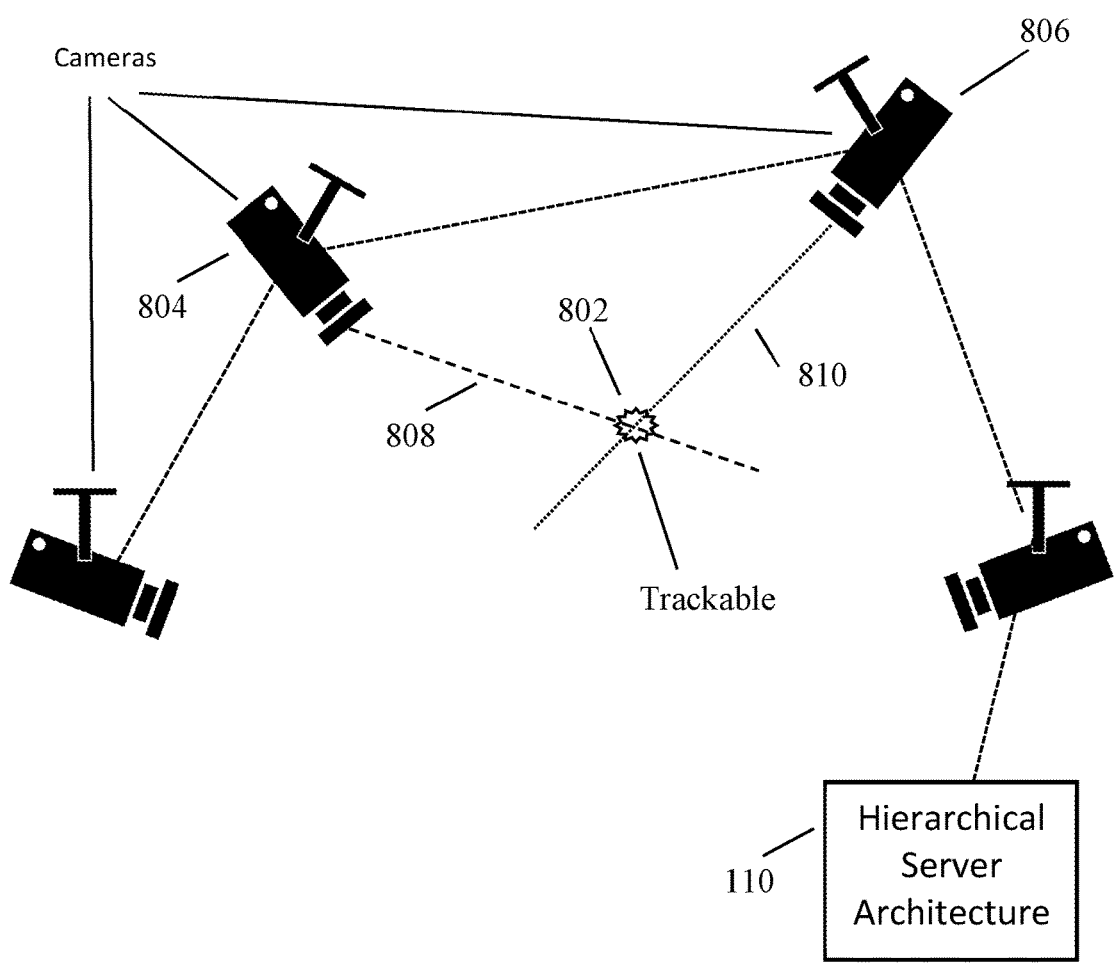
FIG. 8 depicts a plurality of cameras observing a trackable object, with focus on a particular pair of cameras where accuracy will be analyzed.

FIG. 8 shows a plurality of cameras including camera pair 804 and 806 which observe trackable object 802. Vector lines 808 and 810 emanating respectively from each camera intersect in the vicinity of trackable object 802.

Figure 9:
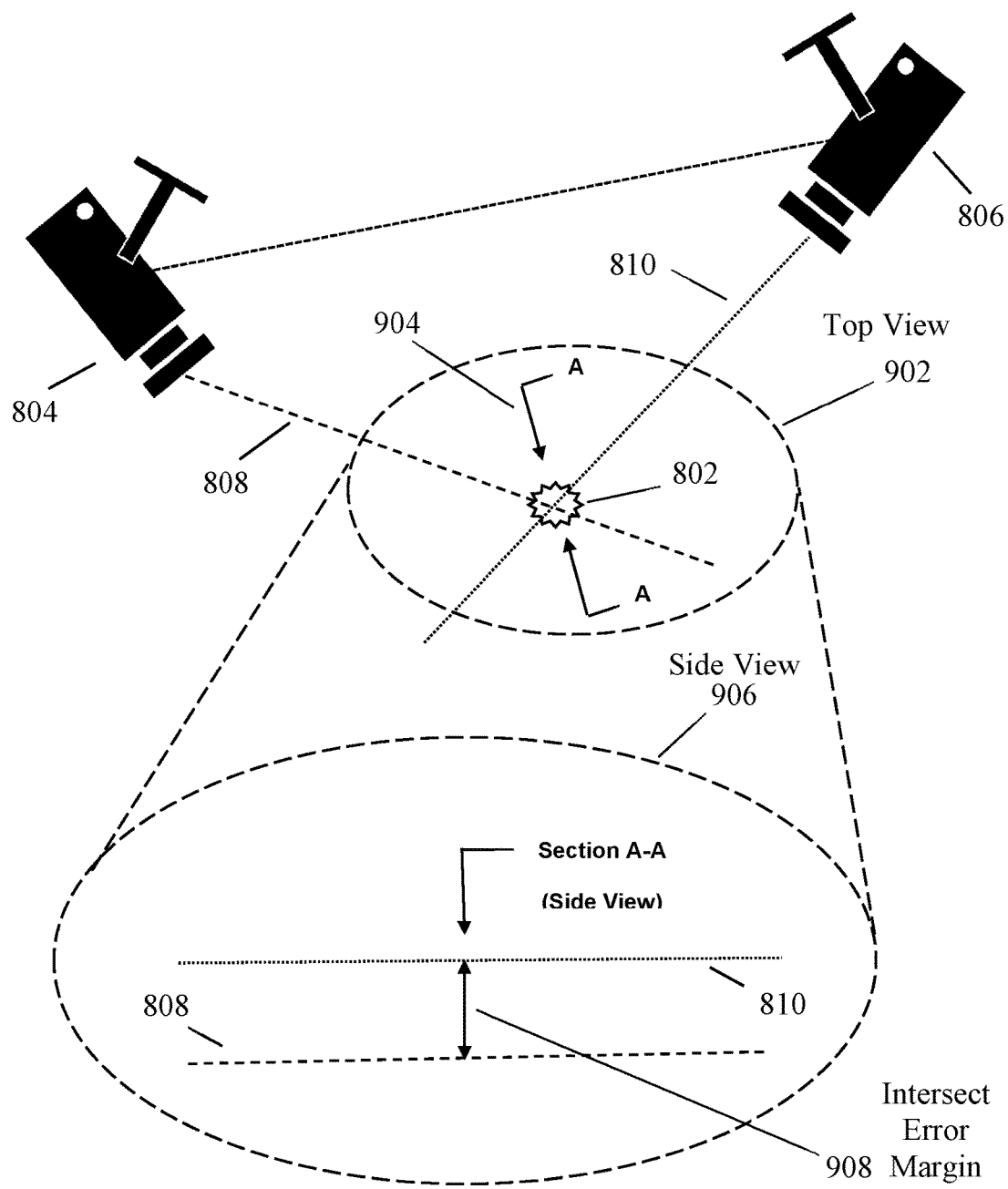
FIG. 9 depicts the pair of cameras of FIG. 8 and the trackable object while showing both top and side views of an intersection of vectors emanating from each of the two cameras of the pair.

FIG. 9 shows the camera pair 804/806 of FIG. 8 and trackable object 802. FIG. 9 focuses on the intersection of vector lines 808 and 810 as they intersect—or come close to intersecting—in the vicinity of trackable object 802. Note that in top view 902 vector lines 808 and 810 appear to be intersecting, while a cross section 904 taken vertically into the page reveals a side-view cross-section diagram 906 where in fact vector lines 808 and 810 do not intersect. As shown in the cross-section diagram of side view 906, vector lines 808 and 810 come within a distance of intersecting that is hereinafter called an Intersect Error Margin 908. In determining camera accuracy and eventually which cameras should be de-emphasized because of inferior accuracy, it is this intersect error margin that is determined among pairs of cameras that will be the determining factor.

The following process describes how data is mixed to get position information. The process begins by getting the first/next trackable object in the list. The process continues by going through all the camera results to find all result data that matches that trackable object (as identified by the camera's ID). Then, all the matching results are looped through, comparing each result as a pair to find where those two results intersect in space. This is done by calculating a line from each camera to the point in space where they detected the trackable marker. As the lines from each will never intersect exactly, the nearest points along both lines are calculated and the process then finds the middle of those points. The error margin at this stage is simply calculated as the distance between those two points. If the error margin between any of the intersects is too great (as compared with a threshold variable defined by configuration), the intersect is discarded. The bad intersect is also logged to help identify poor calibration. Each intersect is then stored in a list along with the detected error margin. The list is then processed to find the final position result. Each result from the list is appended to the final result based on how close it is to perfect accuracy.

To further describe the process, it can also be represented pseudo code as follows:

```
TrackingErrorMargin = 0.1;
NewPosition = Vector3(0,0,0);
PositionWeight = 0;
FOREACH(Intersect in IntersectList) {
; weight = (TrackingErrorMargin − IntersectErrorMargin) / TrackingErrorMargin;
; NewPosition += Intersect.Position * weight;
; PositionWeight += weight;
}
NewPosition /= PositionWeight;
return NewPosition;
```

The final processed position is then applied to the trackable marker/object. The same processed is repeated from the start if the trackable object also has its secondary marker active. A secondary marker on an object also allows rotational position sensing (orientation) for the object when the position of the secondary market is compared with the primary marker on the object. Finally, the process repeats from the start for the next trackable object.

The system has a global variable set which is the 'Tracking Error Margin'. This variable represents the maximum allowable error for the "Intersect Error Margin" for any detected intersection. For example, assume the error margin is set to '0.1', aka 10 cms.

The system starts with an empty Object Position Vector (representing the 3 axis, X, Y and Z in 3D space) called 'NewPosition', and the 'Total PositionWeight' starts at '0'. The detected intersects are then looped through, one at a time.

For each intersect, the following process is performed. The weight for the intersect is calculated as 'TrackingErrorMargin−IntersectErrorMargin (the Intersect's detected error) divided by the TrackingErrorMargin. This results in a value which is much higher, the lower the detected error margin is. Therefore, objects with a very low error margin are given much more weight in the position calculation for the object. An object's position is then multiplied by the Weight, and added to the 'New Object Position Vector." The Weight of this calculation is then added to the 'Total Position Weight' for later use. Once all intersects have been added together in this way, the process divides the final 'Object Position Vector' by the final 'Total Position Weight' which will result in a position accurate to the object's real world position as determined by the weighting given to each position.

A simple example showing how data is mixed to get position information follows:

Assume a system is tracking 2 objects, defined as object 1 and 2. Cameras A, B and C are tracking the objects.

After all results have been collected from the cameras, the results list contains:

Camera A for Object 1
Camera B for Object 1
Camera B for Object 2
Camera C for Object 1
Camera C for Object 2

Next, collect together all results for object 1. The collection would look like:

Camera A for Object 1
Camera B for Object 1
Camera C for Object 1

Loop through all the matching results, comparing each result as a pair to find where those two results intersect in space.

Continuing with the collection for Object 1:

Create pairs of results from the available results. This creates the following pairs:

Camera A-Camera B
Camera A-Camera C
Camera B-Camera C

There are 2 key pieces of information in each result: Camera Position and Result Direction (result direction is the direction from the camera position to the tracked object). This provides an origin and a vector to help determine the object's position.

This is done by calculating a line from each camera to the point in space where they detected the trackable marker. As the lines from each will never intersect exactly, an exemplary process according to the invention determines which cameras possess a level of tracking accuracy such that they minimize the Intersect Error Margin.

In the above example, Cameras A and B have both detected the tracking marker. From top view 902 of FIG. 9, one can clearly see the intersect between both of lines 808 and 810. At the same time, from side view 906 of FIG. 9 the lines don't appear to be intersecting anywhere near the actual object. This inconsistency is due to the two lines never actually touching in 3D space, but they do pass extremely close by each other. So rather than calculating an actual intersect which almost never actually happens, the process according to the invention finds the point where the lines pass closest by each other. Then the nearest points along both lines to the intersect (or near intersect) are calculated and the middle of those points is found.

Figure 10:
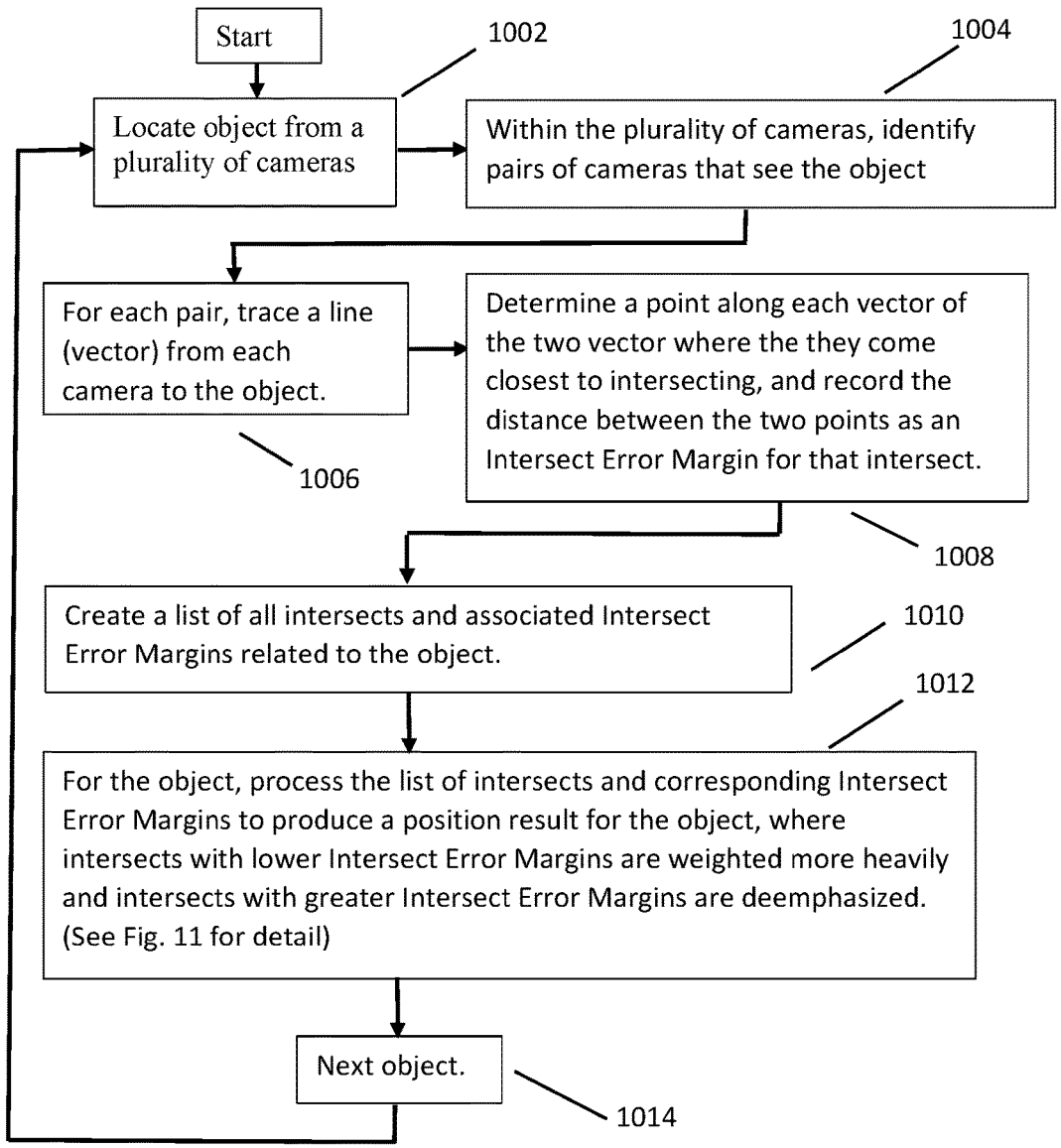
FIG. 10 depicts an overview of an exemplary process for determining an Intersect Error Margin for a pair of cameras observing an object.

An overview of the process for determining camera accuracy on an object-by-object basis is shown in FIG. 10. In step 1002 a first trackable object is located from a plurality of cameras. Then within that plurality of cameras, pairs of cameras that observe the object are identified per step 1004. In step 1006, for each pair of cameras that observe the object, a line (vector) is traced from each camera to the object. In step 1008 a point is determined along each vector of the two vectors where the points on the two vectors come closest to intersecting. The distance between the two points is then recorded as an Intersect Error Margin for that intersect. Per step 1010, a list of all intersects and associated Intersect Error Margins is created relative to the object. Subsequently, the list of intersects and corresponding Intersect Error Margins for that object is processed to produce a position result for the object, where intersects with lower Intersect Error Margins are weighted more heavily and intersects with greater Intersect Error Margins are deemphasized. A more detailed process description for determining how intersects are prioritized with respect to Weights and Intersect Error Margins is described in FIG. 11.

Figure 11:
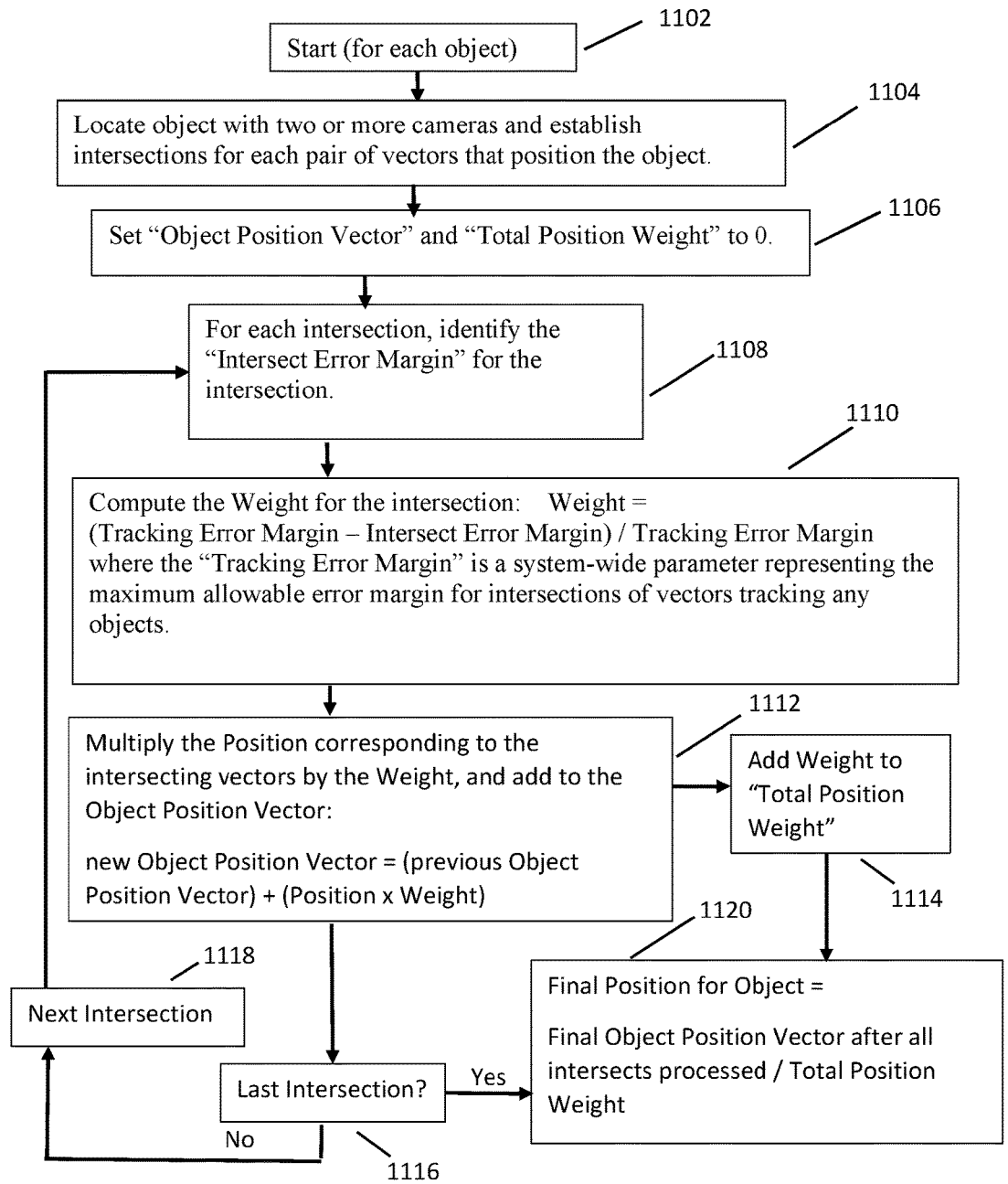
FIG. 11 depicts a detailed process for comparing weighted intersect error margins for a plurality of camera pairs viewing an object including determination of de-emphasis to be applied to certain cameras.

FIG. 11 depicts the detailed process for evaluating one or more pairs of cameras that view each object, and as a result determines a final position for the object while de-emphasizing cameras that are poorly calibrated with respect to position. The process starts 1102 for each object and then locates the object 1104 with two or more cameras to establish intersections for each pair of vectors that position the object. In step 1106 the values for "Object Position Vector" and "Total Position Weight" are set to zero. Next, a process is executed for each intersection to identify 1108 the "Intersect Error Margin" for that intersection. A Weight 1110 is computed for the intersection according to the following equation:

$$\text{Weight} = (\text{Tracking Error Margin} - \text{Intersect Error Margin}) / \text{Tracking Error Margin}$$

For this calculation, "Tracking Error Margin" is a system-wide parameter representing the maximum allowable error margin for intersections of vectors tracking any object. Next, a position corresponding to the intersecting vectors is multiplied 1112 by the Weight value, and added to the previous value of the Object Position Vector to create a new value for the Object Position Vector. Next, it is determined in step 1116 if the intersection just processed was the last intersection associated with the object. If not, the next intersection 1118 is identified and the process repeats at step 1108. If all intersections related to the object have been processed, then the process moves to a final step 1120 where a final position for the object is established. The final position is equal to the final Object Position Vector, after all intersects have been processed, divided by the Total Position Weight. The Total Position Weight is the result of step 1114 where the Weight value computed in step 1110 for each intersection has been accumulated over the processing of all intersections related to the object, to create a value for the Total Position Weight.

The embodiments disclosed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture.

Preferably, the machine is implemented on a computer platform having hardware such as one or more central processing units ("CPUs"), one or more memories, and one or more input/output interfaces. The computer platform may also include an operating system and micro-instruction code. The various processes and functions described herein may be either part of the micro-instruction code or part of the application program, or any combination thereof, which may be executed by a CPU, whether or not such computer or processor is explicitly shown. In addition, various other peripheral units may be connected to the computer platform such as an additional data storage unit and a printing unit.

In embodiments of the invention, the processes are implemented as a control system which can reside within the hierarchical server architecture shown in FIG. 8; however, it will be appreciated that the control system may be located on a server in a remote location, at a location in the Cloud, or distributed among a combination of the above locations, including being distributed among a plurality of servers within the hierarchical server architecture. It will be appreciated that the control system can be located anywhere as long as it has access to the data it needs to perform the processing. The control system typically contains a processor or CPU and memory, as discussed above. Typically, the memory of the control system contains Although a number of possible implementations have been mentioned, these are presented merely for the sake of explanation and teaching, and are not limitative. Moreover, an implementation of an apparatus that falls within the inventive concept does not necessarily achieve any of the possible benefits outlined above: such benefits are dependent on the specific use case and specific implementation, and the possible benefits mentioned above are simply examples.

Although the concepts have been described above with respect to the various embodiments, it is noted that there can be a variety of permutations and modifications of the described features by those who are familiar with this field, only some of which have been presented above, without departing from the technical ideas and scope of the features, which is defined by the appended claims.

Further, while this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

Although the drawings describe operations in a specific order and/or show specific arrangements of components, and are described in the context of access segments of data centers, one should not interpret that such specific order and/or arrangements are limited, or that all the operations performed and the components disclosed are needed to obtain a desired result. There are numerous hardware and software devices that can be configured to forward data units in the manner described in the present disclosure with respect to various embodiments.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The invention has been described in relation to particular examples, which are intended in all respects to be illustrative rather than restrictive. Those skilled in the art will appreciate that many different combinations will be suitable for practicing the present invention. Other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A computerized method wherein one or more processors determine a position of an object in a virtual reality environment while de-emphasizing cameras having less than optimum positioning accuracy, the method comprising:
    locating an object in images received from two or more cameras;
    determining one or more intersections of vectors, wherein each vector originates at a camera and passes near the object;
    establishing a system-wide tracking error margin that represents the maximum allowable error for any detected intersection;
    initializing an object position vector for the object and a total position weight for the object;
    for a first intersection formed between a pair of vectors, performing the steps of:
        (a) identifying an intersect error margin for the intersection that comprises the closest distance between the pair of vectors;
        (b) computing a weight by subtracting the intersect error margin from the tracking error margin and dividing the result by the tracking error margin;
        (c) determining a position for the intersection based on the pair of intersecting vectors; and
        (d) multiplying the position by the weight, and adding the product to the object position vector to produce a revised object position vector;
        (e) adding the weight to the total position weight; and
    dividing the revised object position vector by the total position weight to produce a final position for the object.

2. The method of claim 1, further comprising: repeating steps (a) through (e) for a second intersection formed between a pair of vectors.

3. The method of claim 1, further comprising: locating a plurality of objects with the two or more cameras, and repeating all of the steps for each of the plurality of objects.

4. A system for determining a position of an object in a virtual reality environment while de-emphasizing cameras having less than optimum positioning accuracy, the system comprising:
    a processor;
    a memory containing machine readable medium comprising machine executable code having stored thereon instructions for operating the system, wherein the processor is coupled to the memory, wherein the system is configured to execute the machine executable code to cause the control system to:
    locate an object in images received from two or more cameras;
    determine one or more intersections of vectors, wherein each vector originates at a camera and passes near the object;
    establish a system-wide tracking error margin that represents the maximum allowable error for any detected intersection;
    initialize an object position vector for the object and a total position weight for the object;
    for a first intersection formed between a pair of vectors, perform the steps of:
        (a) identify an intersect error margin for the intersection that comprises the closest distance between the pair of vectors;
        (b) compute a weight by subtracting the intersect error margin from the tracking error margin and dividing the result by the tracking error margin;
        (c) determine a position for the intersection based on the pair of intersecting vectors; and
        (d) multiply the position by the weight, and adding the product to the object position vector to produce a revised object position vector;
        (e) add the weight to the total position weight; and
    divide the revised object position vector by the total position weight to produce a final position for the object.

5. The system of claim 4, wherein the system is configured to execute the machine executable code to further cause the control system to: repeat steps (a) through (e) for a second intersection formed between a pair of vectors.

6. The system of claim 4, wherein the system is configured to execute the machine executable code to further cause the control system to: locate a plurality of objects with the two or more cameras, and repeat all of the steps for each of the plurality of objects.

* * * * *